(12) United States Patent
Todeschini (10) Patent No.: US 6,450,912 B2
(45) Date of Patent: Sep. 17, 2002

(54) HYDROMECHANICAL TRANSMISSION HAVING A CONTINUOUSLY VARIABLE TRANSMISSION RATIO

(75) Inventor: Eugenio Todeschini, Bergamo (IT)

(73) Assignee: Same Deutz-Fahr S.p.A., Bergamo (IT)

( * ) Notice: Subject to any disclaimer, the term of this patent is extended or adjusted under 35 U.S.C. 154(b) by 14 days.

(21) Appl. No.: 09/789,578

(22) Filed: Feb. 22, 2001

(30) Foreign Application Priority Data

Feb. 22, 2000 (IT) ........................................ TO20A0162

(51) Int. Cl.$^7$ ............................................. F16H 47/04
(52) U.S. Cl. ..................... 475/72; 74/732.1; 475/74; 475/80; 477/50; 477/69
(58) Field of Search ............................. 475/72, 74, 76, 475/78, 80; 477/52, 69, 50; 74/731.1, 732.1

(56) References Cited

U.S. PATENT DOCUMENTS

| | | | |
|---|---|---|---|
| 5,156,577 A | | 10/1992 | Fredriksen et al. |
| 5,531,304 A | * | 7/1996 | Ishino et al. ................ 192/4 R |
| 5,667,452 A | | 9/1997 | Coutant |
| 5,820,508 A | * | 10/1998 | Konig et al. ................ 475/210 |
| 5,890,981 A | | 4/1999 | Coutant et al. |
| 6,007,444 A | * | 12/1999 | Kinokami .................... 475/81 |
| 6,056,657 A | * | 5/2000 | Garnett ........................ 475/72 |
| 6,080,074 A | * | 6/2000 | Ulbrich et al. ................ 475/76 |
| 6,203,463 B1 | * | 3/2001 | Casey et al. .................. 475/72 |

FOREIGN PATENT DOCUMENTS

| | | |
|---|---|---|
| WO | WO 96/09482 A1 | 3/1996 |
| WO | WO 99/36285 A2 | 7/1999 |

* cited by examiner

Primary Examiner—Sherry Estremsky
Assistant Examiner—Tisha D. Lewis
(74) Attorney, Agent, or Firm—Sughrue Mion, PLLC (57) ABSTRACT

A transmission comprises: an input shaft intended to be coupled to a motor; an output shaft; an epicyclic reduction unit with an input sun wheel, a ring gear and first and second output shafts respectively fast and slow; a first clutch for connecting the input sun wheel to the ring gear of the said reduction unit; an hydraulic variator unit coupled between the input shaft of the transmission and the input sun wheel; second and third clutches operable to connect the input shaft of the transmission with the ring gear of the epicyclic reduction gear unit to give respective transmission ratios of opposite sign, respectively for forward and reverse gears. The arrangement is such that when the output speed of the variator varies over a predetermined range on either side of zero, and the first clutch is disengaged and the second or third clutch is engaged, the first and the second output shaft of the epicyclic reduction unit have respective speeds which vary over respective ranges of contiguous values. Auxiliary clutches make it possible to achieve coupling of the output shaft of the transmission selectively to the first or the second output shaft of the epicyclic reduction unit with predetermined speed ratios.

4 Claims, 7 Drawing Sheets

HYDROMECHANICAL TRANSMISSION HAVING A CONTINUOUSLY VARIABLE TRANSMISSION RATIO

The present invention relates to a hydromechanical transmission having a continuously variable transmission ratio.

One object of the invention is to provide an improved transmission which allows the continuous variation of the transmission ratio over a wide range, both for positive values and for negative values of this ratio.

This and other objects are achieved according to the invention with a hydromechanical transmission having a continuously variable ratio the salient characteristics of which are defined in the annexed claim 1.

Further characteristics and advantages of the invention will become apparent from the following detailed description given purely by way of non-limitative example, with reference to the attached drawings, in which.

Figure 1:
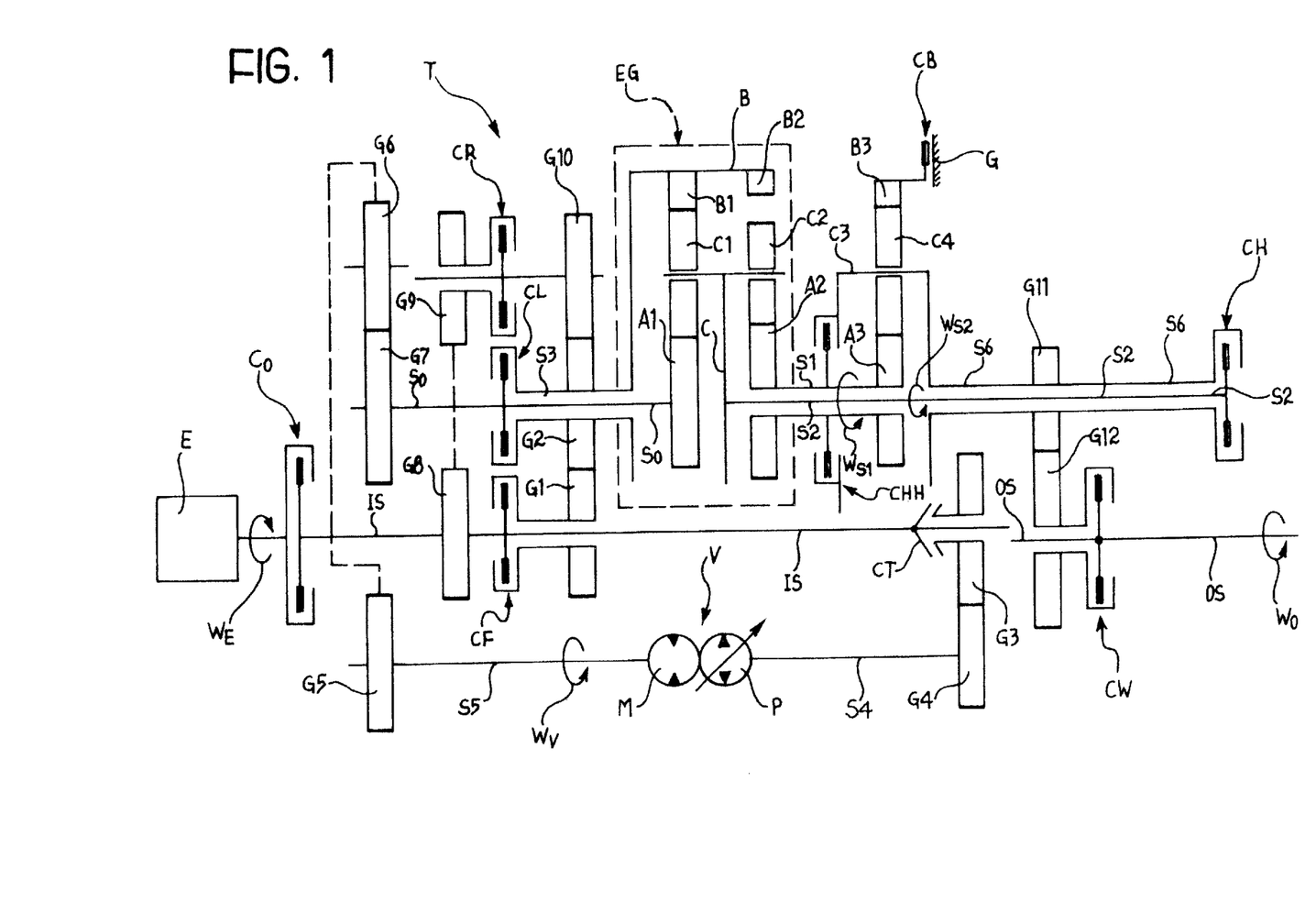
FIG. 1 shows a transmission according to the invention.

In FIG. 1 the reference numeral T generally indicates a transmission according to the invention.

The transmission T has an input shaft IS connectable to a motor E by means of a clutch $C_0$. The output shaft of the transmission is indicated OS.

The transmission T includes an epicyclic reduction unit EG including an input sun wheel A1 fixed to a drive shaft $S_0$, an output sun wheel A2 fixed to a hollow shaft S1, an outer ring gear B with two sets of teeth B1 and B2, and a planet carrier C which carries planets C1 and C2 which mesh between the wheels A1 and A2 and the sets of teeth B1 and B2 respectively.

The planet carrier C is fixed to a shaft S2 coaxial with the shaft S1.

The input shaft IS is connectable by means of a clutch CF to a toothed wheel G1 which is coaxial with the said shaft IS and which meshes with a toothed wheel G2 fixed to a hollow shaft S3 which is fixed to the ring B of the epicyclic reduction gear EG, and coaxial with the shaft $S_0$.

The toothed wheels G1 and G2 provide a transmission ratio which is, for example, substantially equal to 1.

The shafts S3 and $S_0$, and therefore the ring B and the input sun wheel A1, can be connected for rotation by means of a clutch CL.

Downstream from the clutch CF the shaft IS is coupled by means of a further clutch CT to a toothed wheel G3 which meshes with a toothed wheel G4 carried by the input shaft S4 of a hydraulic variator unit V. This unit comprises, for example, a variable flow rate pump P coupled to a hydraulic motor M. Said motor has a fixed displacement volume or capacity, but it can also have a variable capacity.

The clutch CT has the purpose of decoupling the hydrostatic group, for eliminating the consumption of rotation power in conditions such as, in a tractor, the static work at the power takeoff or the starting of the engine.

The output shaft S5 of the variator V carries a toothed wheel G5 which meshes with a toothed wheel G6, in turn coupled to a toothed wheel G7 fixed Lo Lhe input shaft $S_0$ of tho epicyclic reduction gear EG.

Upstream of the clutch CF a toothed wheel G8 is fixed to the shaft IS, which meshes with a toothed wheel G9 which, via a clutch CR, can be coupled for rotation with a toothed wheel G10. This latter meshes with the toothed wheel G2 with a transmission ratio which is, for example, substantially equal to 1.

The shaft S1 of the epicyclic gear unit EG carries a sun wheel A3 coupled to planets C4 carried by a planet carrier C3 which is fixed to a hollow shaft S6 also coaxial with the shaft S2. The planets C4 mesh with an outer ring B3 which, by means of a clutch CB, can be locked to the body or casing G of the transmission.

A clutch CHH makes it possible, when engaged, to couple the shaft S6 for rotation with the shaft S1 via the planet carrier C3.

A clutch CH, when engaged, makes it possible to couple the shafts S2 and S6 for rotation together.

The unit A3-C4-B3-C3 is such that when the clutch CB is engaged, and therefore the ring B3 is locked, and the clutches CH and CHH are disengaged, the planet carrier C3 and the shaft S6 turn at a low speed reduced by a divisor τ (for example equal to 4) with respect to the speed of rotation of the output shaft S1 of the epicyclic reduction gear EG.

When, on the other hand, the clutches CB and CH are disengaged and the clutch CHH is engaged, the planet carrier C3 and the shaft S6 rotate at the same speed as the output shaft S1 of the epicyclic reduction gear EG.

The shaft S6 carries a toothed wheel G11 which meshes with a toothed wheel G12 which is coaxial with the output shaft OS. The wheels G11 and G12 together provide a speed reduction of a ratio α>1.

The toothed wheel G12 can be coupled with the output shaft OS of the transmission by means of the clutch CW.

Transmission T described above is for example formed in such a way that if the shaft of the motor E rotates at a speed $\omega_E$ and the clutch CF is engaged:

the speed $\omega_V$ of the output shaft S5 of the variator V is variable between a maximum value and a minimum value equal to $\omega_E$ and $-\omega_E$ respectively, upon variation of the flow rate and direction of the flow of the hydraulic fluid in the pump P of the variator; and the speed $\omega_{S1}$ of the shaft S1 and the speed $\omega_{S2}$ of the shaft S2 at the output of the epicyclic reduction gear unit EG vary between $\omega_E$ and $2\omega_E$, and between $\omega_E$ and $0.5\omega_E$ respectively upon variation of $\omega_V$ between $\omega_E$ and $-\omega_E$.

The above explanation is summarised in the following Table 1.

TABLE 1

| $\omega_V$ | $\omega_{B1}$ | $\omega_{E2}$ |
|---|---|---|
| $\omega_E$ | $\omega_E$ | $\omega_E$ |
| $-\omega_E$ | $2\omega_E$ | $\frac{1}{2}\omega_E$ |

If, as in the numerical example which will be described below, the speed of rotation $\omega_E$ of the motor shaft E is equal to 2300 revolutions per minute, the speeds shown in the preceding Table assume the following values (in revolutions per minute):

TABLE 2

| $\omega_V$ | $\omega_{B1}$ | $\omega_{B2}$ |
|---|---|---|
| 2300 | 2300 | 2300 |
| −2300 | 4600 | 1150 |

The mode of operation of the transmission T described above will now be described with reference to the graph of FIG. 2 in which the speed values indicated correspond to the exemplary values of the speeds shown in Table 2.

Figure 2:
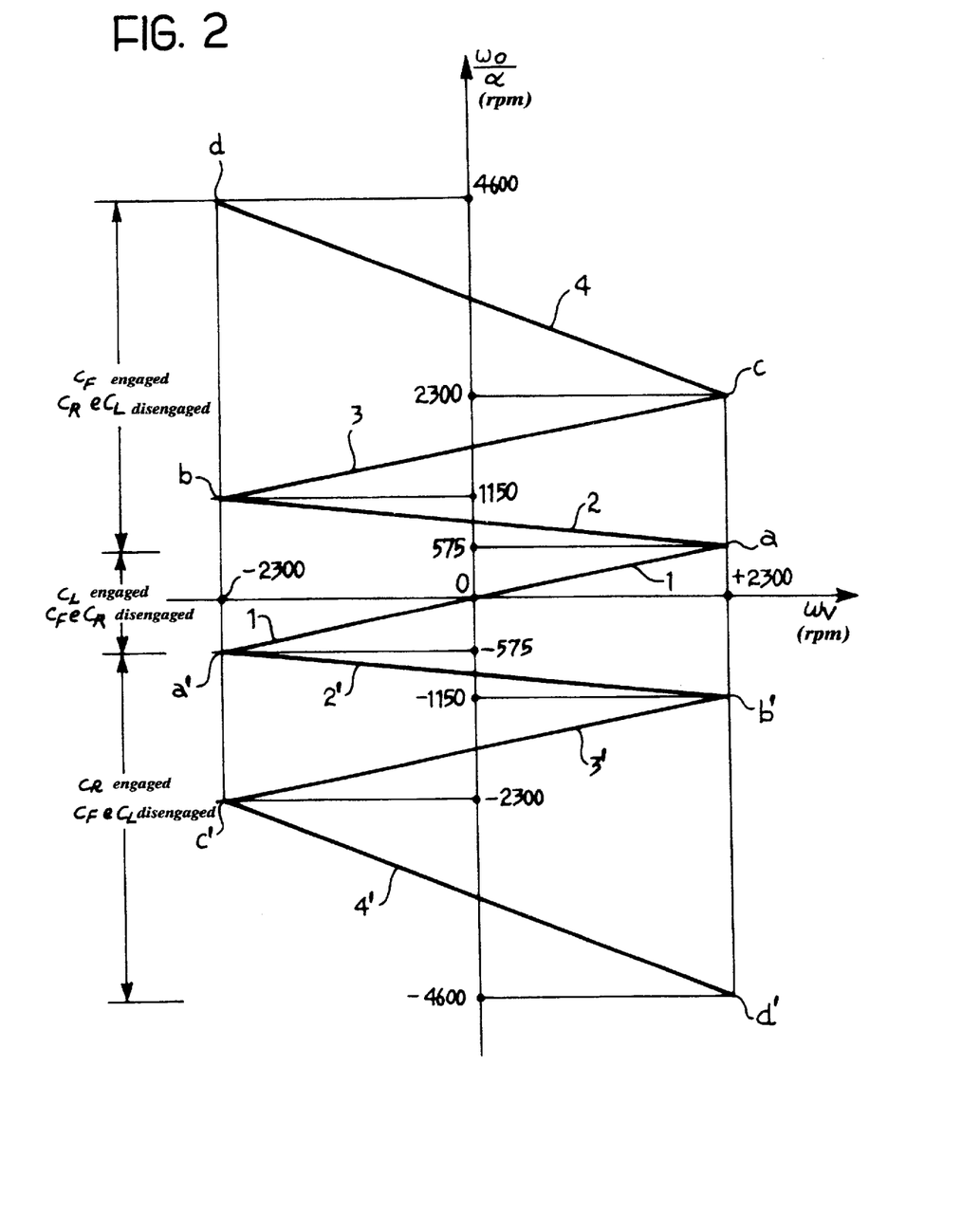
FIG. 2 is a graph which shows the operating characteristics which can be achieved with the transmission according to FIG. 1.

In FIG. 2 there is shown an operating characteristic which can be achieved with the transmission according to the invention.

In this Figure, the speed $\omega_V$ of the output shaft S5 of the variator V is plotted along the ordinate, and the speed $\omega_0$ of the output shaft OS of the transmission, divided by the reduction ratio $\alpha$ achieved by the toothed wheels G11 and G12 is plotted along the ordinate.

The characteristic shown in FIG. 2 presents a symmetrical variation with respect to the origin O and comprises a linear central section 1 passing through the origin, an upper portion comprising three linear sections 2, 3 and 4, and a lower portion comprising three linear sections 2', 3' and 4'.

In operation the central section 1 of the characteristic is achieved in the following manner. The clutches $C_0$, CT and CW are engaged so that the shaft of the motor E is coupled to the variator V by means of the gearing G3, G4.

The clutches CF and CR are disengaged.

The clutch CL is engaged so that the ring B of the epicyclic unit EG is coupled for rotation with the shaft $S_0$ and the input sun wheel A1, and the input shaft $S_0$ of the said unit is coupled to the output shaft of the variator V by means of the gears G5, G6, G7.

In these conditions the output shaft S1 of the epicyclic reduction gear EG rotates at the same speed as the input shaft $S_0$, which is driven by the output shaft S5 of the variator V.

The clutch CB is engaged and the clutch CHH is disengaged. The clutch CH is also disengaged.

The shaft S6 now rotates at a speed equal to the speed of the shaft S1 of the epicyclic reduction gear EG divided by the ratio $\tau$ achieved by the unit A3, C4, B3, C3.

The output shaft OS from the transmission T rotates at the speed of the shaft S6, reduced by the factor $\alpha$ by the gears G11, G12.

In the central section 1 of the characteristic of FIG. 2, with the numerical values indicated above, upon overall variation of the speed $\omega_V$ of the variator from −2300 to 30 2300 revolutions per minute, the output shaft OS of the transmission T is made to rotate at a speed $\omega_0$ which varies between $(-\omega_V/\tau)\,\alpha$ and $(+\omega_V/\tau)\,\alpha$, that is to say between $(-2300/4)\,\alpha=-575\alpha$ and $(+2300/4)\,\alpha=+575\,\alpha$. These speeds of the output shaft OS are reached at the points a and a' of the characteristic of FIG. 2.

The sections 2, 3 and 4 of the characteristic are representative of forward gears, starting from the point a as follows.

At point a the speed $\omega_0$ of the output shaft OS is, as mentioned, equal to +575 $\alpha$.

If, in this condition, the clutch CL is disengaged and clutch CF engaged, leaving the conditions of the other clutches unchanged, the speed $\omega_0$ of the output shaft OS is again (for $\omega_V=+2300$, that is to say at point a) equal to +575 $\alpha$. In fact, the shaft S1 of the epicyclic reduction gear, according to Table 2, rotates at a speed $\omega_{S1}=2300$ revolutions per minute. The shaft S6 rotates at the speed of the shaft S1 reduced by the dividing factor $\tau$, and the output shaft OS is driven to rotate by the shaft S6 via the reduction gearing G11, G12.

At point a, after commutation of the clutches CL and CF, the speed $\omega_0$ of the output shaft from the transmission is therefore again equal to $(+2300/\tau)\,\alpha=575\,\alpha$.

If the speed $\omega_V$ of the variator V is now caused to go from +2300 to −2300 revolutions per minute, the speed $\omega_0$ of the output shaft OS varies according to the relation $\omega_0$ equals $(\omega_{S1}/\tau)\,\alpha$. The speed $\omega_{S1}$ of the output shaft S1 of the epicyclic reduction gear EG varies (according to Table 2) from +2300 to +4600 revolutions per minute, and therefore between the points a and b (section 2) of the characteristic of FIG. 2, the output speed $\omega_0$ varies between $(2300/4)\,\alpha=575\,\alpha$ (at point a), and $(+4600/4)\,\alpha=1150\,\alpha$ (at point b).

At point b the planet carrier C and the output shaft S2 of the epicyclic reduction gear EG rotate at a speed $\omega_{S2}=+1150$ revolutions per minute (Table 2) which is equal to the speed $\omega_{S1}/\tau=4600/4$ of shaft S6.

At point b it is now possible to engage the clutch CH and disengage clutch CB and, having effected these operations, the output shaft OS of the transmission is coupled to the output shaft S2 of the epicyclic reduction gear EG, still via the gearing G11, G12.

If the output speed $\omega_V$ of the variator V is now made to pass from −2300 to +2300 revolutions per minute, the speed $\omega_0$ of the output shaft OS of the transmission varies according to relation $\omega_0=(\omega_{S2})\,\alpha$. The speed $\omega_{S2}$ varies from 1150 to 2300 revolutions per minute (Table 2) and therefore the speed $\omega_0$ of the output shaft OS passes from 1150 $\alpha$ (at point b) to 2300 $\alpha$ revolutions per min. (at point c).

At point c the speeds $\omega_{S2}$ and $\omega_{S1}$ are equal to one another and to 2300 revolutions per minute (Table 2). It is now possible to disengage the clutch CH and engage the clutch CHH in such a way that the output shaft OS of the transmission is coupled to the output shaft S1 of the epicyclic reduction gear EG, still via the gearing G11, G12. The clutch CB remains disengaged.

The output speed $\omega_V$ of the variator V is now made to pass again from +2300 to −2300 revolutions per minute and the speed $\omega_0$ of the output shaft OS of the transmission varies according to the relation $\omega_0=(\omega_{S2})\,\alpha$. The speed $\omega_{S1}$ varies from 2300 to 4600 revolutions per minute (Table 2), and therefore the speed $\omega_0$ of the output shaft OS passes correspondingly from 2300 $\alpha$ (at point c) to 4600 $\alpha$ (at point d).

In sections 2', 3' and 4' the clutches CL and CF are disengaged whilst the clutch CR is engaged (starting from point a') . In these sections the operation of the transmission T therefore follows an identical person to that described above with reference to sections 2, 3 and 4 save for the fact that after engagement of the clutch CR between the drive shaft E and the shaft S3 of the epicyclic reduction gear EG the transmission of drive takes place now through three toothed wheels G8, G9–G10 and G2 rather than through the two toothed wheels G1 and G2 which act in sections 2, 3, 4 when clutch CF is engaged and clutch CR is disengaged.

Therefore, in sections 2', 3' and 4' transmission of drive from the motor E to the shaft S3 of the epicyclic reduction gear EG is reversed in sign with respect to the sections 2, 3, 4. The sections 2', 3' and 4' are therefore symmetrical to the sections 2, 3 and 4 with respect to the origin O, the management of the clutches CB, CH and CHH being the same in these sections as already described with reference to sections 2, 3 and 4.

The above explanation in relation to a fixed numerical example can be generalised in such a manner that when the speed $\omega_V$ of the variator V varies from $-\omega_E$ to $+\omega_E$, the speed $\omega_{S1}$ of the output shaft S1 of the epicyclic unit EG varies from $+\omega_E$ to $+k\omega_E$ (k>1) and correspondingly the speed $\omega_{S2}$ of the shaft S2 varies from $+\omega_E$ to $\omega_E/k$, with $\tau=1/k^2$.

Figure 3:
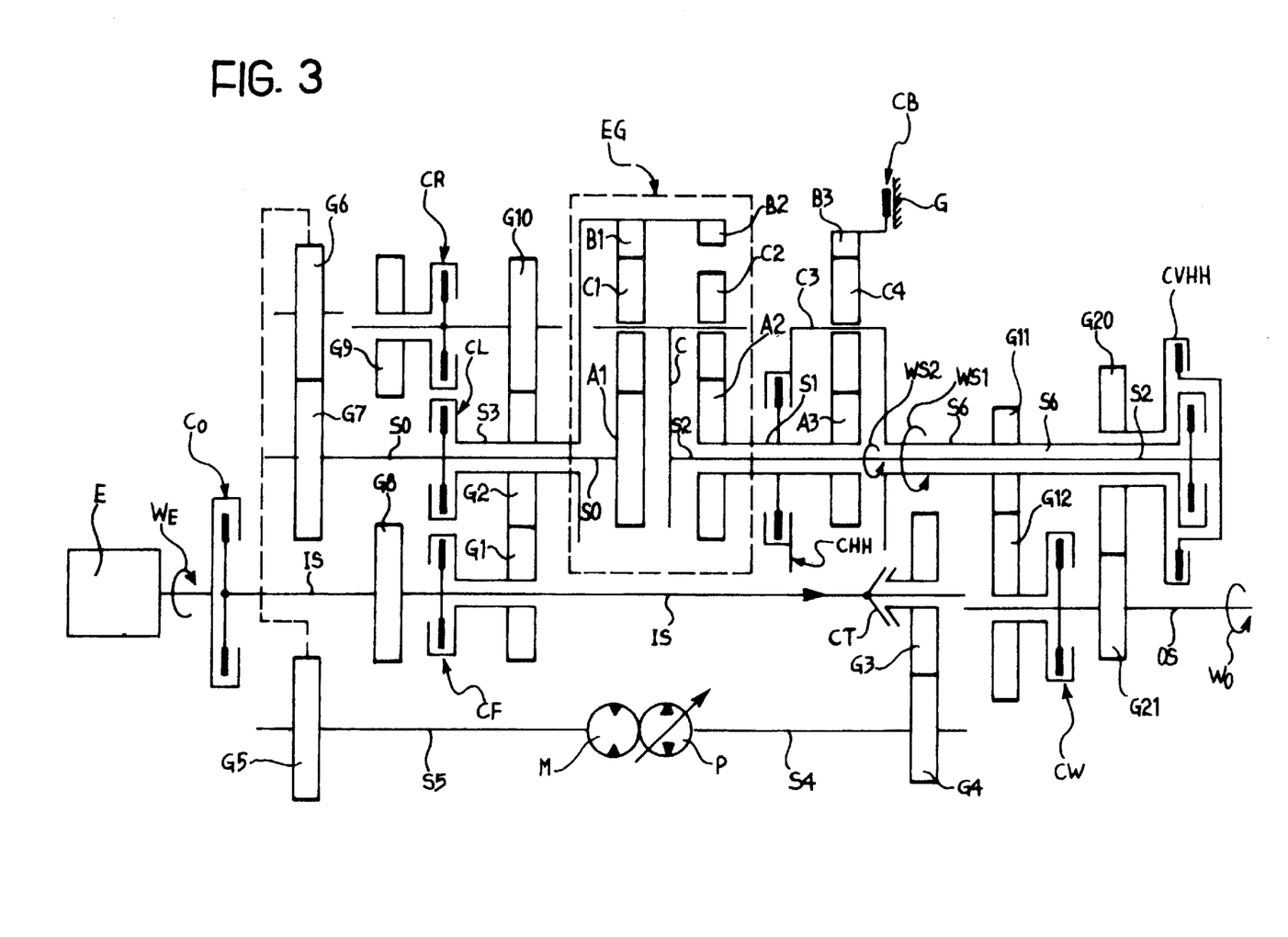
FIG. 3 shows a further transmission according to the invention.

In FIG. 3 there is shown a similar embodiment to that previously described with reference to FIG. 1. In FIG. 3 the parts and elements which are the same as or correspond to parts and elements already described have again allocated the same alphanumeric reference symbols utilized previously.

The transmission of FIG. 1 can be defined by 4 modes of operation:

A first mode, essentially of "hydrostatic" type, corresponds to section 1 of FIG. 2; there are then 3 forward gear modes (and 3 reverse gear modes) corresponding to the sections 2, 3 and 4 (2', 3' and 4') of FIG. 2.

Figure 4:
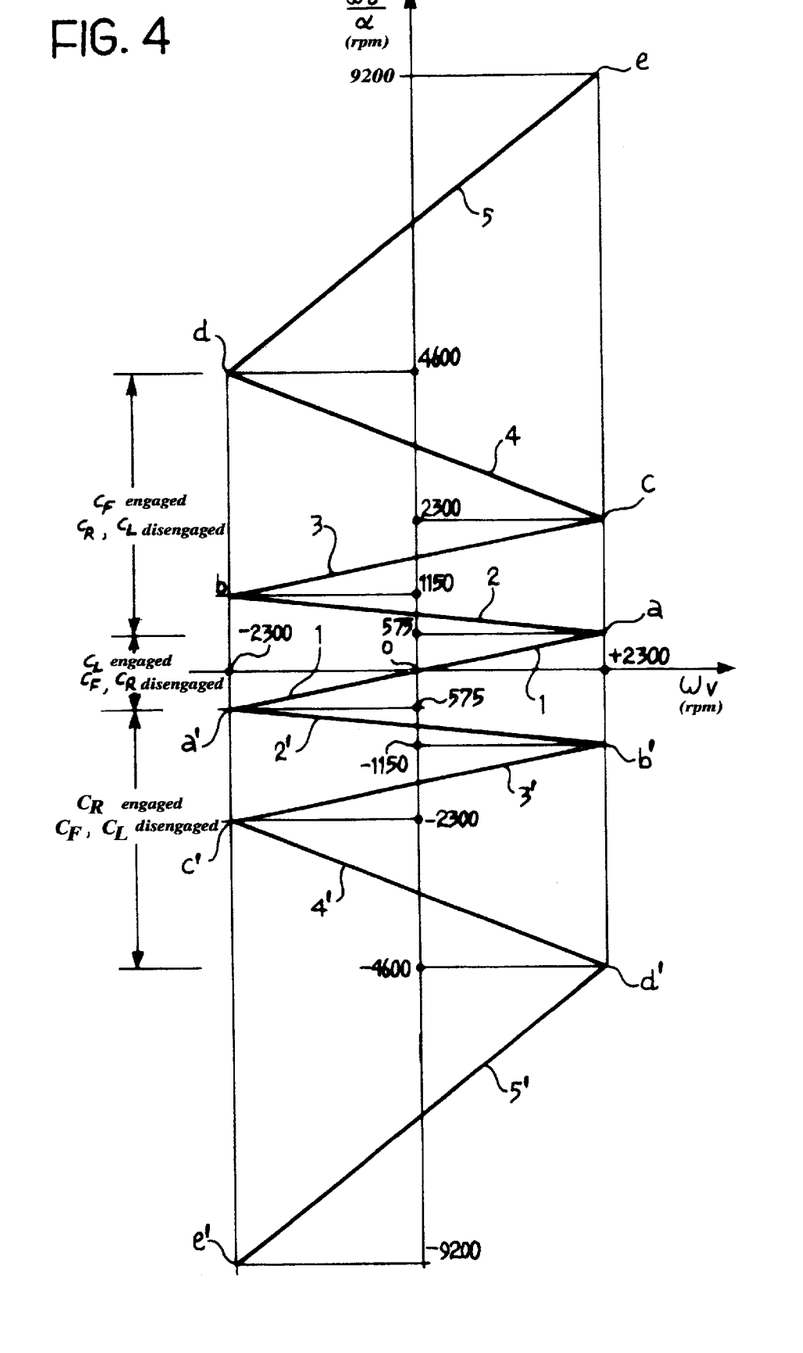
FIG. 4 is a graph which shows the operating characteristics which can be achieved with the transmission of FIG. 3.

By contrast, as will be seen, the transmission of FIG. 3 has five modes of operation, or rather— beyond the same four modes as the transmission of FIG. 1— it has a fifth forward gear mode (and a corresponding fifth reverse gear mode). The operating characteristic for the transmission of FIG. 3 is shown in FIG. 4.

Briefly, in the transmission shown in FIG. 3 the shaft S2 can be coupled to the output shaft OS via a further clutch CVHH and a speed multiplier gear comprising two toothed wheels G20 and G21. This gearing G20, G21 multiplies the speed by a factor $\beta=\alpha k^2$.

The first four modes of operation of the transmission of FIG. 3 are identical to those of the transmission of FIG. 1. In the transmission of FIG. 3, when in the branch 4 (4') it arrives at point d (d') of FIG. 2 or 4, it is possible to engage the clutch CVHH (until now disengaged); in fact, in this condition the output shaft OS rotates at a speed $$\omega_0=\omega_{S1}\cdot\alpha=2\omega_E\cdot\alpha(k=2)=4600\cdot\alpha$$

and this speed is the same as that to which the shaft S2 tends to make the output shaft rotate via the multiplier G20, G21:

$$\omega_{S2}\cdot\beta=\omega_{S2}\cdot\alpha\cdot k^2=\omega_{S2}\cdot\alpha\cdot 4=1150\cdot\alpha\cdot 4=4600\cdot\alpha$$

Starting from point d (d') the operation of the transmission of FIG. 3 can thus continue following section 5 (5') of FIG. 4 up to the point e (e') at which the speed $\omega_0$ of the output shaft reaches the maximum value of 9200 ·α revolutions per minute.

Figure 5:
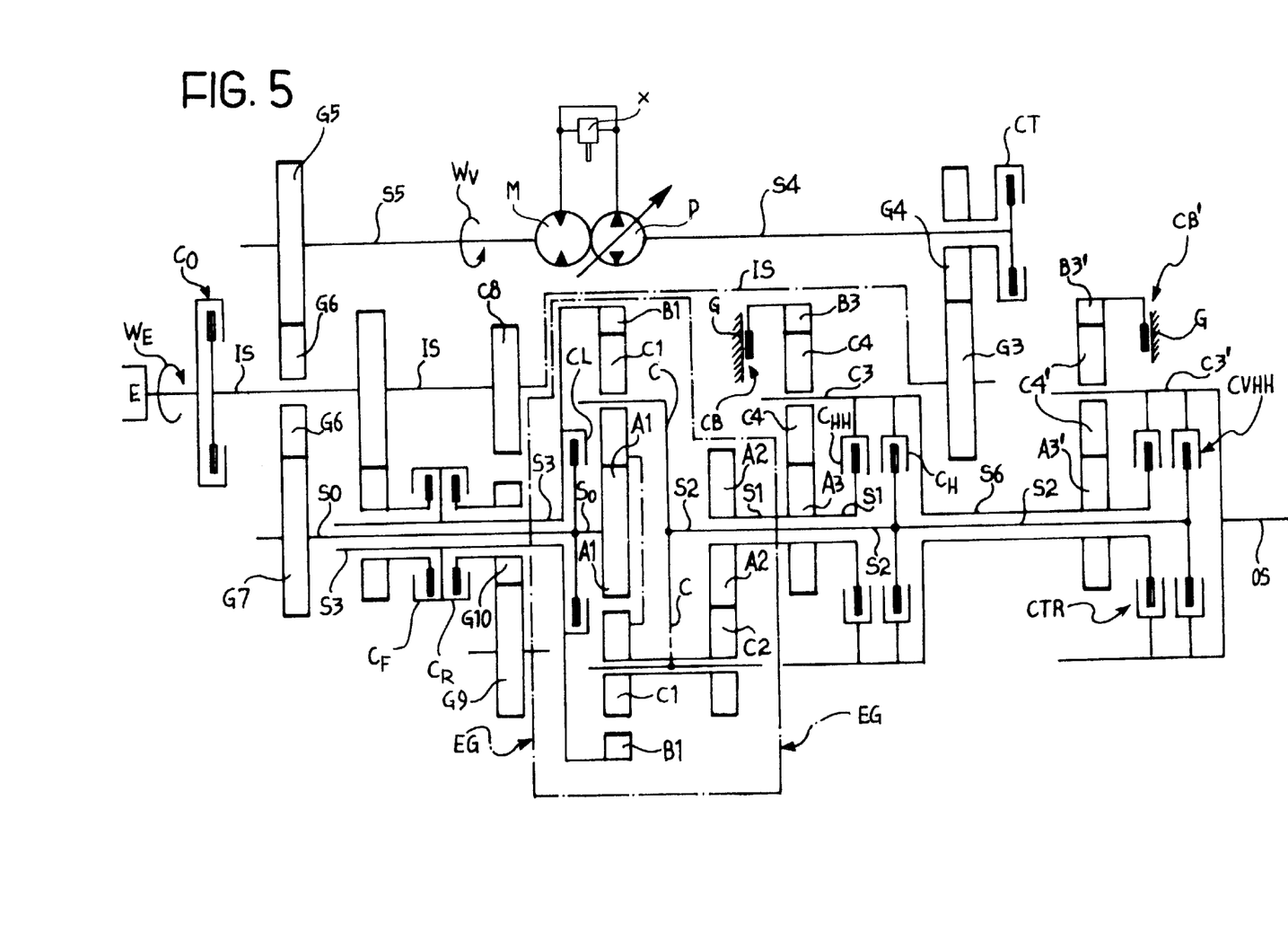
FIG. 5 shows a further transmission according to the invention.

In FIG. 5 there is shown a further transmission according to the invention, of the type having 6 modes of operation. Although the layout of the transmission of FIG. 5 is a little different from those of FIGS. 1 and 3, those parts and elements which are the same or essentially equivalent in FIG. 5 to parts or elements already described have been allocated the same alphanumeric reference symbols utilised previously.

Briefly, in the transmission according to FIG. 5 the shafts S6 and S2 belong to a reduction unit A3'-C4'-B3'-C3' similar to the unit A3-C4-B3-C3 already described.

The planet carrier C3' is fixed for rotation with the output shaft OS and can be selectively coupled to the shaft S6 or the shaft S2 by engaging a clutch CTR (analogous to the clutch CHH) or a clutch CBHH (analogous to the clutch CH). A clutch CB', when engaged, locks the ring B3', and then the planet carrier C3' and the output shaft OS rotate at a speed reduced by a divisor τ' (also equal to 4, for example) with respect to the speed of the shaft S6.

As the man skilled in this art will appreciate, a suitable management of the clutches of the transmission according to FIG. 5 makes it possible to operate in six modes, in particular as shown in the following Table 3:

TABLE 3

| MODE | $C_F$ | $C_R$ | $C_L$ | CHH | CH | CVHH | CTR | CB | CB' |
|---|---|---|---|---|---|---|---|---|---|
| 1 | | | X | | | | | X | X |
| 2 (2') | X | (X) | | | | | | X | X |
| 3 (3') | X | (X) | | | X | | | | X |
| 4 (4') | X | (X) | X | | | | | | X |
| 5 (5') | X | (X) | X* | | | X | | | |
| 6 (6') | X | (X) | X | | | | X | | |

X = engage
*preferably engaged

It will be noted that this Table 3 is also valid for the transmissions of FIGS. 1 and 3, obviously up to the fourth and, respectively, the fifth mode and excluding column CB'.

With the transmission of FIG. 5 it is therefore possible to achieve an operating characteristic $\omega_0/\omega_V$ with

- a first section (passing through the origin) in which the speed $\omega_0$ of the output shaft varies according to the relationship $\omega_0=\omega_V/(\tau\cdot\tau')$ where τ and τ' are the reduction ratios achieved by the units A3-C4-B3-C3 and A3'-C4'-B3'-C3' when the clutches CB and CB' are engaged,
- a second section in which $\omega_0=\omega_{S2}/\tau'$,
- a third section in which $\omega_0\omega_{S2}/\tau'$,
- a fourth section in which $\omega_0=\omega_{S1}/\tau'$,
- a fifth section in which $\omega_0=\omega_{S2}$, and
- a sixth section in which $\omega_0=\omega_{S6}=\omega_{S1}$ Corresponding relations are valid in the reverse gear operation.

Figure 6:
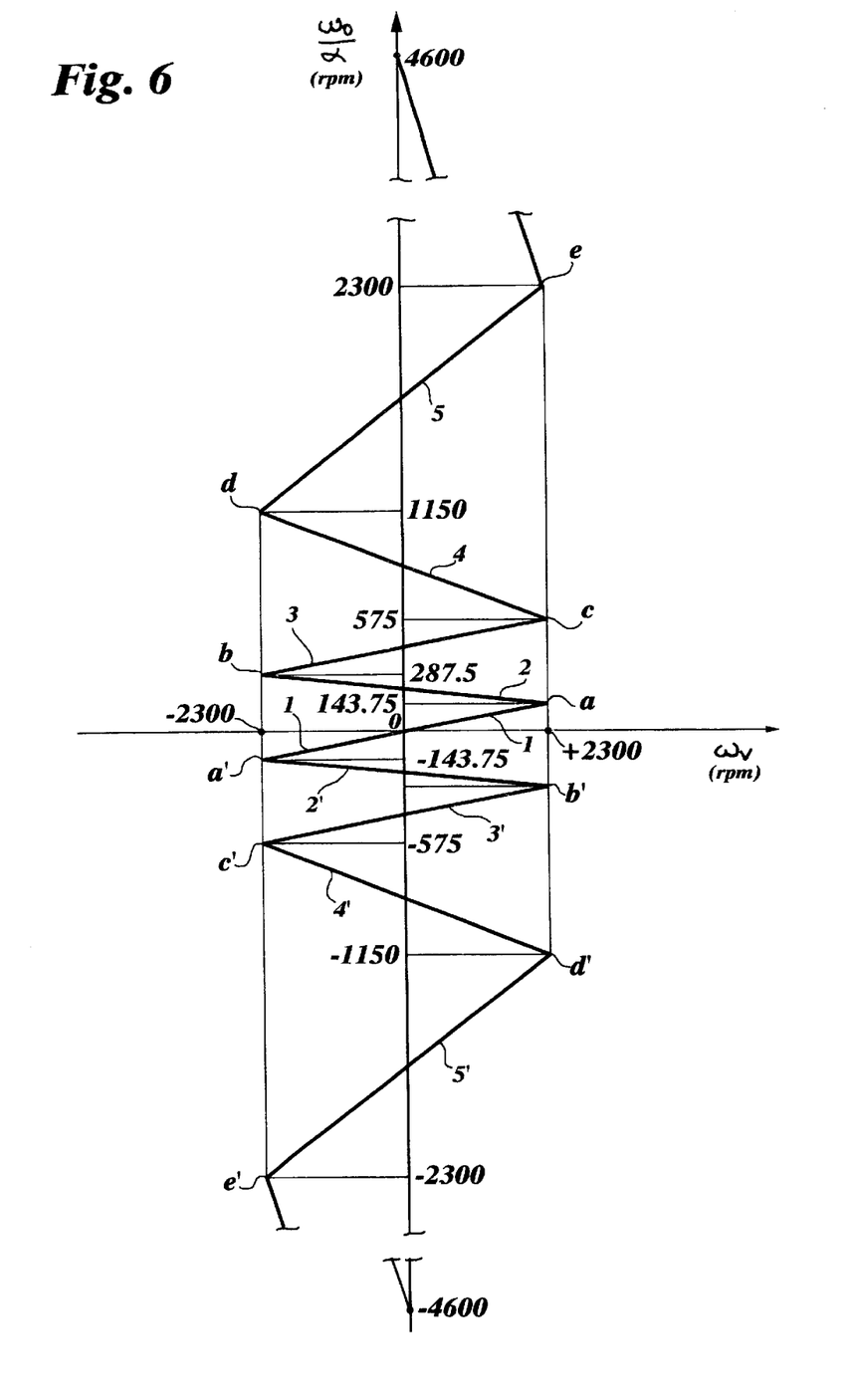
FIGS. 6 and 7 are graphs which show operating characteristics which can be achieved with the transmission of FIG. 5.

FIG. 6 shows the operating characteristic curve for the transmission of FIG. 5. The portion of said characteristic curve relating to the first five modes has the same shape of the characteristic curve of FIG. 4, with the values of $\omega_0/\alpha$ reduced by τ' (assumed equal to 4) in view of the presence, in the transmission of FIG. 5, of the further reduction unit A3'-C4'-B3'-C3'-CB'.

Figure 7:
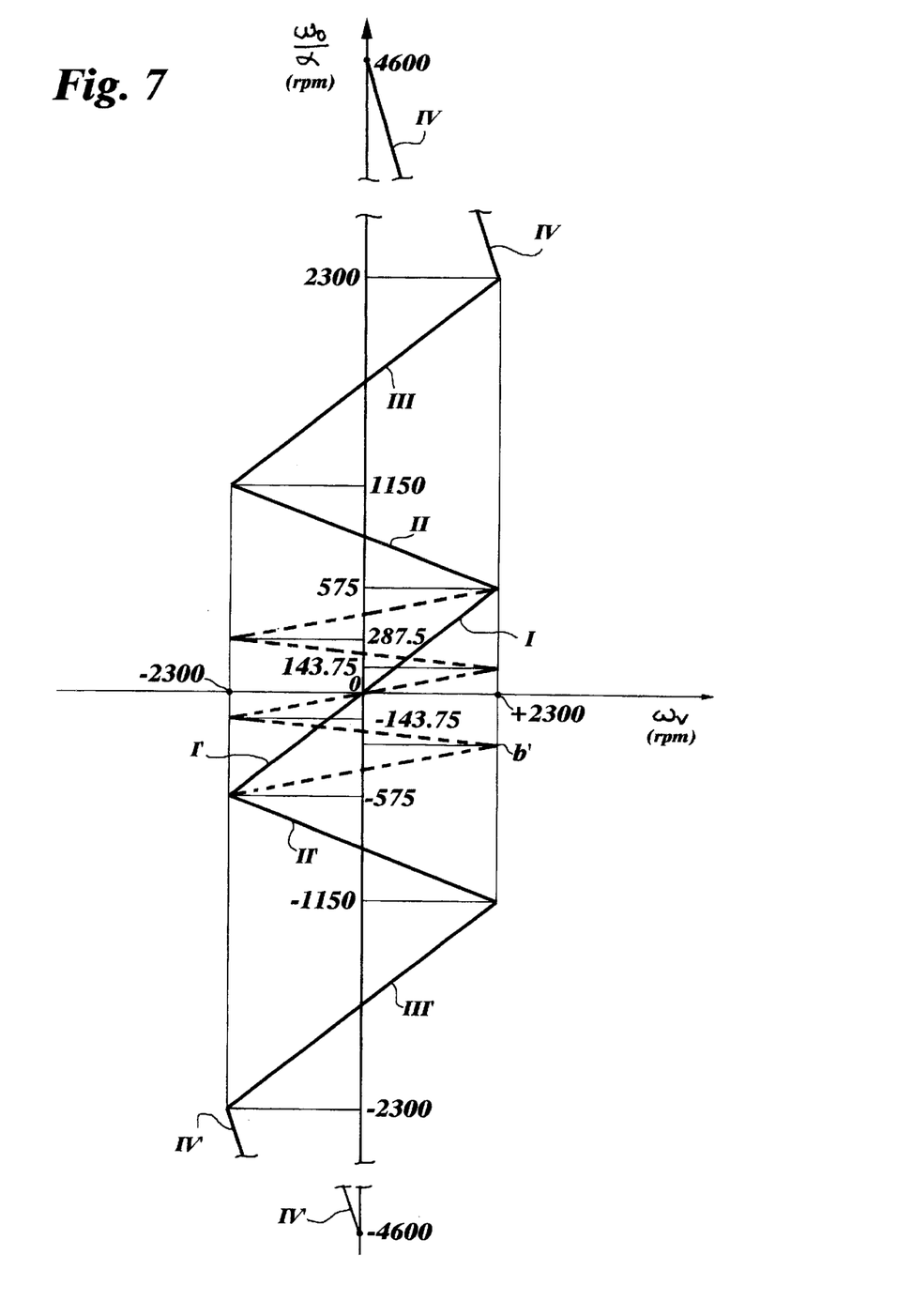

It is noted that the system of FIG. 5 having six modes of operation, can be made to operate also in four modes only, i.e. in the following:

- a first mode (or section of the characteristic curve $\omega_0/\omega_V$) in which $\omega_0=\omega_V/\tau'$,
- a second mode in which $\omega_0=\omega_{S1}/\tau'$,
- a third mode in which $\omega_0=\omega_{S2}$, and
- a fourth mode in which $\omega_0\times\omega_{S1}$, thus achieving a same overall speed range, by extending the first mode up to the speed achieved at the end of the third mode of the operation in six modes, as it is shown in the graph of the annexed FIG. 7.

In the operation in four modes the clutches of FIG. 5 are operated in accordance with the following Table 4:

TABLE 4

| MODE | $C_F$ | $C_R$ | $C_L$ | CHH | CH | CVHH | CTR | CB | CB' |
|---|---|---|---|---|---|---|---|---|---|
| I (I') | | | X | X | | | | | X |
| II (II') | X | (X) | | X | | | | | X |
| III (III') | X | (X) | | X | | X | | | |
| IV (IV') | X | (X) | | X | | | X | | |

The possibility of operating in four/six modes is particularly interesting for controlling the vehicle speed, permitting (in the operation in four modes) higher acceleration values at the start, when a high traction is not needed at the same time.

It is also noted that in FIGS. 1 and 5 two different input reversing arrangements are shown, the reversing function being achievable by a plurality of other per se known arrangements.

The group comprising the variable pump/the motor with fixed or variable capacity can be conveniently provided with a modulator valve X (FIG. 5) placed across the high pressure and the low pressure lines connecting said units. The purpose of said valve, which can be operated through the friction clutch or other means, is that of allowing to control, up to the reduction to zero, the pressure differential of the hydrostatic group, and thus the transmitted torque, when the transmission operates in the first mode.

This function is particularly useful for the manoeuvrability of the vehicle at low speeds and during the coupling of implements.

In a similar manner transmissions having even more than six modes of operation can be formed.

Naturally, the principle of the invention remaining the same, the embodiments and details of construction can be widely varied with respect to what has been described and illustrated purely by way of non-limitative example, without by this departing from the ambit of the invention as defined in the following claims.

What is claimed is:

1. A hydromechanical transmission having a continuously variable speed ratio, comprising
    an input shaft intended to be coupled to a motor,
    an output shaft,
    an epicyclic reduction gear with an input sun wheel, a ring gear and first and second respectively fast and slow output shafts,
    a first clutch operable to couple the input sun wheel, the ring gear and the said reduction unit for rotation together,
    an hydraulic variator unit coupled between the input shaft of the transmission and the input sun wheel of the epicyclic reduction unit;
    second and third clutches operable to couple the input shaft of the transmission to the said ring gear of the epicyclic reduction unit with respective transmission ratios of opposite sign, respectively for forward and reverse gears;
    the arrangement being such that when the output speed of the variator varies over a predetermined range on either side of zero, and the said first clutch is disengaged and the said second or third clutch is engaged, the said first and second output shafts of the epicyclic reduction gear unit have respective speeds which vary over respective ranges of contiguous values;
    auxiliary clutch means being provided for coupling the output shaft of the transmission selectively to the first or second output shaft of the epicyclic reduction gear unit with predetermined speed ratios,
    in such a way that the transmission can operate in
    a first mode in which the said first clutch is engaged and the second and third clutches are disengaged, the output shaft of the transmission is coupled to an output shaft of the epicyclic reduction gear unit and its speed varies in a manner proportional to the output speed of the variator;
    a plurality of successive forward gear modes in which the said first clutch is disengaged, the said second clutch is engaged a plurality of successive reverse gear modes in which the said first clutch is disengaged, the said third clutch is engaged, and the output shaft of the transmission is selectively coupled to the first or the second output shaft of the epicyclic reduction gear unit via the said auxiliary clutch with the said predetermined speed ratios.

2. A hydromechanical transmission according to claim 1, in which the said hydraulic variator unit includes a pump of variable flow rate and an associated hydraulic motor, and is adapted to be disengaged by means of a clutch associated with it.

3. A hydromechanical transmission according to claim 2, wherein to said variator unit there is associated a modulating valve adapted to allow to control the pressure differential of said group in the above-said first mode of operation.

4. A hydromechanical transmission according to claim 1, comprising means which are selectively switchable to provide an operation according to a first or a second sequence of modes, selectively.

* * * * *